United States Patent
Najman

(10) Patent No.: US 12,455,885 B2
(45) Date of Patent: Oct. 28, 2025

(54) COMPUTING THREAT DETECTION RULE SYSTEMS AND METHODS

(71) Applicant: Avast Software s.r.o., Prague (CZ)

(72) Inventor: Michal Najman, Vsetin (CZ)

(73) Assignee: Avast Software s.r.o., Prague (CZ)

( * ) Notice: Subject to any disclaimer, the term of this patent is extended or adjusted under 35 U.S.C. 154(b) by 225 days.

(21) Appl. No.: 17/873,611

(22) Filed: Jul. 26, 2022

(65) Prior Publication Data

US 2024/0037103 A1 Feb. 1, 2024

(51) Int. Cl.
G06F 16/20 (2019.01)
G06F 16/242 (2019.01)
G06F 16/2455 (2019.01)

(52) U.S. Cl.
CPC ...... G06F 16/24564 (2019.01); G06F 16/244 (2019.01)

(58) Field of Classification Search
CPC .......................... G06F 16/244; G06F 16/2456
USPC .......................................................... 707/694
See application file for complete search history.

(56) References Cited

U.S. PATENT DOCUMENTS

| | | | | |
|---|---|---|---|---|
| 10,798,113 | B2 * | 10/2020 | Muddu | H04L 63/1441 |
| 11,258,805 | B2 * | 2/2022 | Nguyen | H04W 12/12 |
| 11,824,646 | B1 * | 11/2023 | Muddu | H04L 63/1408 |
| 2017/0063888 | A1 * | 3/2017 | Muddu | G06F 16/9024 |
| 2017/0063890 | A1 * | 3/2017 | Muddu | G06N 5/022 |
| 2017/0091451 | A1 * | 3/2017 | Kováč | G06F 21/562 |
| 2017/0132413 | A1 * | 5/2017 | Augustýn | G06F 16/164 |
| 2017/0286677 | A1 * | 10/2017 | Morkovský | G06F 16/22 |
| 2018/0367551 | A1 * | 12/2018 | Muddu | G06F 16/24578 |
| 2019/0342311 | A1 * | 11/2019 | Muddu | G06N 5/022 |
| 2019/0394220 | A1 * | 12/2019 | Gupta | G06F 18/24 |
| 2020/0021607 | A1 * | 1/2020 | Muddu | G06F 3/04842 |

(Continued)

FOREIGN PATENT DOCUMENTS

| | | | |
|---|---|---|---|
| EP | 4481601 | * | 12/2024 |
| EP | 4481601 A1 | * | 12/2024 |

OTHER PUBLICATIONS

Yara the Pattern Matching SwissKnife for Malware Researchers(andEveryoneElse),https://virustotal.github.io/yara/,: accessedApr. 12, 2022.*

(Continued)

*Primary Examiner* — Daniel A Kuddus
(74) *Attorney, Agent, or Firm* — Dovas Law, P.C.

(57) ABSTRACT

A computing threat detection rule method and system for performing the method. The method includes determining identifiers for data points. One or more terms for each of the data points are determined to determine terms respectively associated with the identifiers. Collections of identifiers respectively associated with the terms are determined, the number of identifiers in each of the collections of identifiers limited to a threshold number. Conditions of a rule are determined. The conditions of the rule are compared to the terms to determine matching terms respectively associated with corresponding collections of identifiers. An intersection of the corresponding collections of identifiers is determined, and a number of the data points covered by the rule is determined based on the intersection of the corresponding collections of identifiers. A transmission is performed based on the number of the data points covered by the rule.

32 Claims, 5 Drawing Sheets

(56) References Cited

U.S. PATENT DOCUMENTS

| | | | |
|---|---|---|---|
| 2020/0036743 A1* | 1/2020 | Almukaynizi | G06N 3/044 |
| 2020/0314117 A1* | 10/2020 | Nguyen | H04L 63/145 |
| 2021/0097179 A1* | 4/2021 | Kovác | G06F 16/285 |
| 2021/0120022 A1* | 4/2021 | Kaderábek | H04L 63/101 |
| 2023/0131525 A1* | 4/2023 | Šopák | G06F 21/561 |
| | | | 726/1 |

OTHER PUBLICATIONS

On Synopses for Distinct-ValueEstimation UnderMultisetOperations, K. Beyer et al., SIGMOD'07: Proceedingsof the2007ACMSIGMODinternationalconferenceonManagementofdata, Jun. 11,2007, pp. 199-210.*

Theta Sketch Set Operations, https://datasketches.apache.org/docs/Theta/ThetaSketchSetOps.htmi, accessed Apr. 12, 2022.*

Sketch of the Day: K-Minimum Values, Matt Curcio, July, 9, 2012, https://agkn.wordpress.com/2012/07/09/sketch-of-the-day-k-minimum-values/, accessed Apr. 12, 2022.

Theta Sketch Set Operations, https://datasketches.apache.org/docs/Theta/ThetaSketchSetOps.html, accessed Apr. 12, 2022.

\* cited by examiner

200

RULE CONDITION 202

Flag all data points that created a file named "troj.exe"

CORRESPONDING TERM 204 created_files[].name == "troj.exe"

COVERED DATA POINT 206

```
{
   "created_files" : [
      {"name":"troj.exe"},
      {"name":"benign_file.txt"}
   ],
   "created_files_count":2
}
```

COMPUTING THREAT DETECTION RULE SYSTEMS AND METHODS

FIELD OF INVENTION

This disclosure relates to detection rules for computing threats.

BACKGROUND

Traditionally, computing threat detection systems have been built with computing threat detection rules (e.g., YARA rules). In this design framework, a suspicious file is tested against a set of rules and if the file meets conditions of any of the rules, the file is considered a threat. A common requirement applied to threat detection rules is that a rule cannot trigger false alarms on a curated set of benign (nonthreatening) files.

In a manual rule generation schema, a malware researcher, for example, may create a rule to capture an emerging malware strain based on a set of collected characteristics. To verify that the created rule is specific to the target malware strain (i.e., a low prevalence of false positives) and sensitive enough to capture the strain's variants (i.e., a high prevalence of true positives), a rule verification tool is used (e.g., a YARA scanner). In an automatic rule generation schema, an algorithm searching through a space of admissible rules may regularly check prospective rule modifications for their added value or to determine whether a rule modification meets particular problem constraints.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A provided method includes receiving a plurality of data points and determining a plurality of identifiers for the plurality of data points. One or more terms for each of the plurality of data points are determined to determine a plurality of terms respectively associated with the plurality of identifiers. Based on the plurality of terms respectively associated with the plurality of identifiers, a plurality of collections of identifiers respectively associated with the plurality of terms are determined, the number of identifiers in each of the plurality of collections of identifiers limited to a threshold number. A rule is received, and a plurality of conditions of the rule are determined. The plurality of conditions of the rule are compared to the plurality of terms to determine a plurality of matching terms respectively associated with corresponding collections of identifiers of the plurality of collections of identifiers. An intersection of the corresponding collections of identifiers is determined, and a number of the plurality of data points covered by the rule is determined based on the intersection of the corresponding collections of identifiers. A transmission is performed based on the number of the plurality of data points covered by the rule.

A system is provided including one or more processors and memory storing executable instructions that, as a result of being executed, cause the system to perform operations. The operations include receiving a plurality of data points, determining a plurality of identifiers for the plurality of data points, and determining one or more terms for each of the plurality of data points to determine a plurality of terms respectively associated with the plurality of identifiers. The operations further include determining, based on the plurality of terms respectively associated with the plurality of identifiers, a plurality of collections of identifiers respectively associated with the plurality of terms, the number of identifiers in each of the plurality of collections of identifiers limited to a threshold number. The operations further include receiving a rule, determining a plurality of conditions of the rule, and comparing the plurality of conditions of the rule to the plurality of terms to determine a plurality of matching terms respectively associated with corresponding collections of identifiers of the plurality of collections of identifiers. The operations further include determining an intersection of the corresponding collections of identifiers, determining a number of the plurality of data points covered by the rule based on the intersection of the corresponding collections of identifiers, and performing a transmission based on the number of the plurality of data points covered by the rule.

A non-transitory computer-readable storage medium is provided which stores executable instructions that, as a result of execution by one or more processors of a computer system, cause the computer system to perform operations. The operations include receiving a plurality of data points, determining a plurality of identifiers for the plurality of data points, and determining one or more terms for each of the plurality of data points to determine a plurality of terms respectively associated with the plurality of identifiers. The operations further include determining, based on the plurality of terms respectively associated with the plurality of identifiers, a plurality of collections of identifiers respectively associated with the plurality of terms, the number of identifiers in each of the plurality of collections of identifiers limited to a threshold number. The operations further include receiving a rule, determining a plurality of conditions of the rule, and comparing the plurality of conditions of the rule to the plurality of terms to determine a plurality of matching terms respectively associated with corresponding collections of identifiers of the plurality of collections of identifiers. The operations further include determining an intersection of the corresponding collections of identifiers, determining a number of the plurality of data points covered by the rule based on the intersection of the corresponding collections of identifiers, and performing a transmission based on the number of the plurality of data points covered by the rule.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENTS

Figure 1:
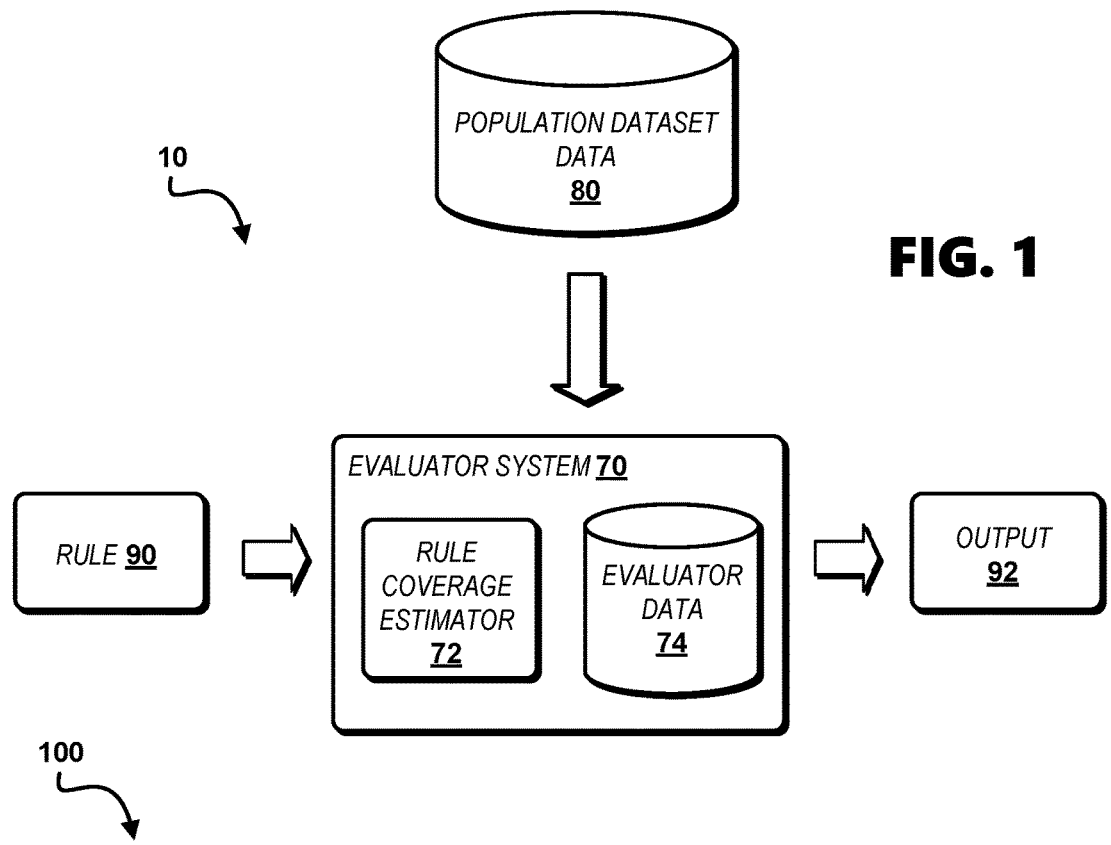
FIG. 1 is a diagram showing a process flow enabled by an evaluator system.

In testing a rule for detecting or mitigating electronic threats, it is beneficial to test the rule on a curated set of malicious (threatening) files to determine if the rule correctly determines that known malicious files are malicious. It is further beneficial to test the rule on a curated set of benign (non-malicious, non-threatening) files to determine if the rule erroneously determines that one or more benign files are malicious ("false alarm"). It may be difficult to obtain the number of false alarms on a curated set of benign files promptly, on a large scale, and without significant restrictions to allowed data types which can be tested. False alarms assessment is an instance of a more general framework called a rule coverage problem where the goal is to compute the number of objects that satisfy a given rule. Existing systems that attempt to solve the rule coverage problem have various limitations such as restricted input data format, restricted rule expressivity, slow speed, and low test file capacity.

Described herein are systems and methods for solving the rule coverage problem efficiently, promptly, and on a large scale, allowing for various data types and wide rule expressivity. Although expressive enough in many use cases, the described systems and methods impose useful limitations to rule expressivity. Use cases and requirements of the rule coverage problem are described herein.

Regarding rule condition data sources, while some rules used for threat detection are built with hash matching conditions or byte sequence conditions, others utilize report logs produced by file inspection tools (Fileinfo™) or cybersecurity sandboxes (GVMA™, Cuckoo™) There are use case specific arguments for using particular types of conditions. The strongest argument to use report log conditions is that report log conditions provide explainability and transparency, because typically a report log is a structured human-readable extract of important characteristics of an examined file. For example, a report log may contain extra files created during runtime or the portable executable ("PE") section table characteristics. Hence, a rule containing report log conditions can be usually interpreted and used in threat intelligence analysis.

Regarding rule condition expressivity, a report log condition includes a pointer to a report log section and a test value. Some rule language systems allow for wide expressivity: equality, inequality, wild cards, or regular expressions (e.g., YARA). Other systems limit the condition test to equality, while effectively trading off expressivity for speed.

Regarding rule structure, oftentimes, rules in a threat-detection system are linked with the OR relation. Conditions of a rule may be combined using a variety of logical operators (e.g., NOT, AND, OR). Despite the lack of universal expressivity, in some cases rules using only AND operators to relate conditions are able to successfully cover a group of threats.

Regarding the rule coverage problem, given a large set of file report logs and a threat-detection rule, the herein described systems and methods are effective to compute the rule coverage-that is the number of file report logs that satisfy the rule. For example, the false positives of a malware rule are the non-malicious ("clean") files covered by the rule. Therefore, to compute the false positive rate of a rule, one must compute the rule coverage of clean files.

Herein described systems and methods are effective to carry out coverage computation promptly (e.g., <10 ms) to allow for automatic rule generation. The described methods can be carried out against a high volume of meaningful report logs (e.g., 1 billion report logs) while maintaining robustness of the results.

Herein described systems and methods utilize a Kth minimum value sketch ("KMV"), which is a probabilistic data structure that estimates the number of distinct values in a data stream. A parameter "K" controls the number of data stream values held in the sketch, effectively guaranteeing that the memory footprint is bounded. The larger the value of K, the lower the estimate error. Moreover, KMVs support set operations (intersection, union, subtraction) which is significant in use cases where the number of distinct values is estimated from a combination of data streams. Herein described systems and methods solve the rule coverage problem, satisfying the criteria above while using KMV sketches. Alternatively, herein described systems and methods can utilize other sketch types to estimate a number of distinct values in a data stream, for example Flajolet-Martin ("FM") or HyperLogLog ("HLL") sketches.

The rule coverage problem on JavaScript™ Object Notation ("JSON") files can be described as a document retrieval problem. The number of retrieved documents matching a query is the coverage of the query. Therefore, an appropriate transformation from a rule to a query combined with a compatible search engine may address a document retrieval problem. For example, Postgres™, MongoDB™ or Elasticsearch™ searches all provide users with a JSON term lookup. However, those solutions will timewise always scale with the number of samples and the rule expressivity will always be limited by the rule-to-query transformation. On the other hand, the herein described systems and methods are bound in time and space and do not require transforming a rule to a restricting look-up query.

Referring to FIG. 1, a process flow 10 enabled by an evaluator system 70 is provided. Given an input rule 90, the evaluator system 70 estimates the coverage of the input rule 90 against a set of structured data from a population dataset datastore 80. The estimate of the coverage of the input rule 90 is provided as an output 92 of the evaluator system 70. The evaluator system 70 is particularly effective at threat detection rule coverage estimation on a large scale.

In a hypothetical example implementation of the evaluator system 70, a malware detection rule is manually or automatically generated with conditions built upon Cuckoo Sandbox™ ("Cuckoo™") report logs (i.e., behavioral file analysis logs). Given the nature of threat detection, it is important to identify false alarms (i.e., false positives) of the malware detection rule. Since Cuckoo™ report logs are JSON™ files (structured data), the evaluator system 70 can be used to compute the false alarms. An evaluator instance on the evaluator system 70 is populated with report logs, for example with one (1) billion clean-labeled (i.e., non-malicious) Cuckoo™ report logs, that an input rule 90 will be tested against to estimate false alarms. The input rule 90 is transmitted to the populated evaluator instance on the evaluator system 70. The output 92 is generated promptly and includes a value that estimates the number of clean-labeled report logs that are covered by the input rule 90 (i.e., report logs that meet all rule conditions). In other words, the evaluator instance on the evaluator system estimates the number of false alarms of the input rule 90.

The evaluator system 70 includes an evaluator datastore 74. The evaluator datastore 74 includes one or more read-only databases that use Kth Minimum Value (KMV) sketches. Alternatively, a database can use other sketch types, for example Flajolet-Martin ("FM") or HyperLogLog ("HLL") sketches. The evaluator system 70 further includes a rule coverage estimator 72 that implements a rule coverage estimation algorithm. In a population phase, the evaluator system 70 is populated with data points (e.g., a large number of JSON files) from a population dataset datastore 80, and the data points are encoded and saved into the evaluator datastore 74. In a serving phase, the evaluator system 70 receives a rule 90 for threat detection and estimates the number of report logs which are covered by the input rule 90, using information encoded in the evaluator datastore 74. The compression rate and estimation accuracy of the output 92 is controlled by a hyper-parameter K which relates to a maximum row size in the evaluator datastore 74.

A population dataset includes a set of structured data points (e.g., one (1) billion JSON files) in the population dataset datastore 80. Each data point is associated with an arbitrary unique identifier (e.g., a sha256 hash). An input rule 90 includes one or more test rule conditions linked with the logical operator AND. Rule conditions are compared to values in the population dataset. The input rule 90 covers a data point if all rule conditions are met. The output 92 is an estimate of the number of data points that are covered by the input rule 90.

To avoid testing each rule condition against all data points in the population dataset, population data of the population dataset are transformed and stored in a table in the evaluator datastore 74. The table is configured to instantly search for population data points that meet a given condition of the input rule 90.

The population dataset is a set of structured data points which include the following properties: a) a data point can have an arbitrarily deep hierarchical structure, b) a data point can include multiple unordered sets, including higher order settings (e.g., a set in a set), c) a data point can have an arbitrary structure (i.e., schemaless), and d) a data point is reducible to a set of one or more terms, wherein a term includes a unique path to a data leaf and a value at the data leaf.

An example of a compatible data point type is a JSON file which can be arbitrarily deep in structure, supports arrays, and is schemaless. To comply with the property "b" when using JSON files, arrays are interpreted as unordered collections, in contrast to the standard JSON interpretation of arrays that are ordered. While such interpretation can be limiting, for example in regard to potential rule expressivity, such interpretation entails that a JSON file is reducible to an unordered set of terms (i.e., property "d"). In the context of JSON files, a term includes a "term path" which is a sequence of keys leading to a data leaf, and a "term value" which is the value (e.g., text string or number) located at the data leaf.

Figure 2:
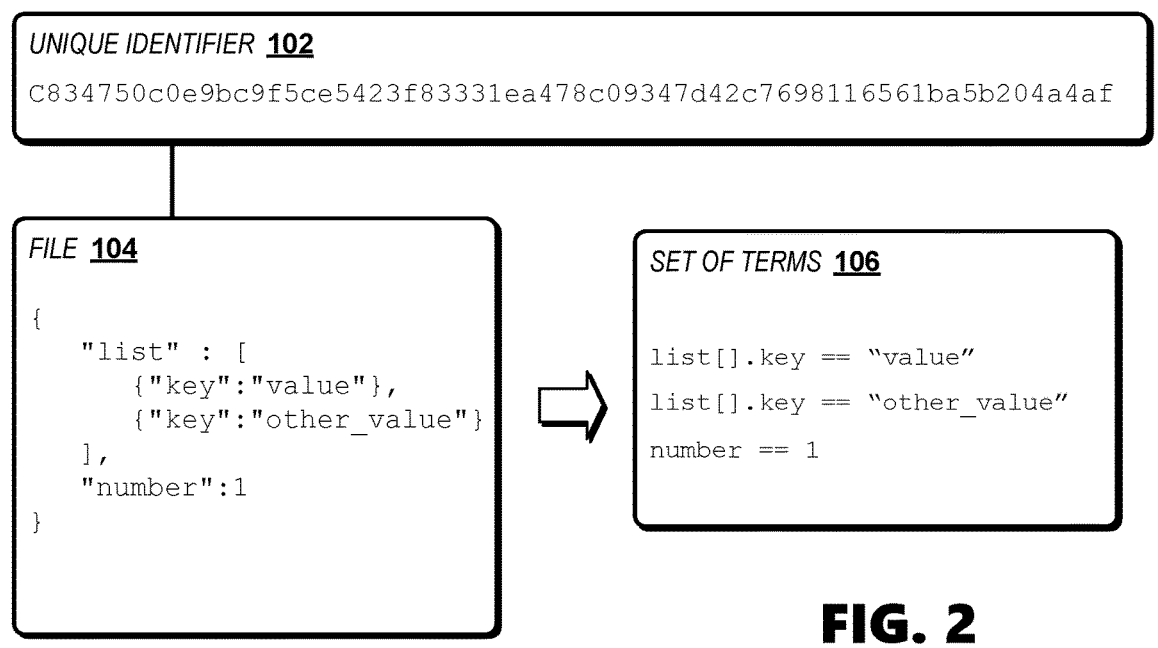
FIG. 2 is a diagram showing a reduction process including hypothetical data in which a file is assigned an identifier and reduced to a set of terms.

Referring to FIG. 2, an example of reduction to terms is demonstrated by an exemplary reduction process 100, including hypothetical data, in which a file 104 (e.g., a JSON file as shown) representing a data point is processed to be equivalently represented by a set of terms 106 (e.g., three terms as shown), notwithstanding the order of objects in the array of objects of the file 104. Each data point is associated with a unique identifier 102 with the following properties: i) each identifier 102 is assigned to a data point uniformly randomly, ii) identifiers 102 are unique, iii) identifiers 102 are sortable. An identifier 102 can be created for example by applying a hash function such as sha256 to transform a data point into a byte sequence supported by a hash collision check to ensure uniqueness. As described herein, a population dataset in the population dataset datastore 80 includes a number of data points (e.g., a large number of data points, such as a billion data points) that are each represented by a set of one or more terms by application of the evaluator system 70. Each data point is associated with a unique identifier 102.

In an illustrative embodiment, the unique identifiers are derived as values between zero and 1. For example, for identifiers created by applying a sha256 identifier, a binary form of the identifier can be used to interpret the raw bytes as a number. Since all sha256 identifiers have the same length (256 bits) the maximum number interpretable from sha256 is known. Dividing the number interpretation of the identifier by the maximum number yields a value between 0 and 1. Alternatively, a random number generator can be used to generate a unique identifier having a value between 0 and 1 for each data point.

In the serving phase, the evaluator system 70 accepts a rule 90 and estimates the coverage of the rule via the rule coverage estimator 72. Rules 90 include the following properties: 1) a rule includes one or more conditions, 2) conditions are linked with the logical operator AND, 3) conditions do not relate to each other (condition tests are independent), 4) a condition is a logical predicate that specifies a data leaf and a test value, 5) each condition tests for strict-equality only, i.e., the numeric value or the text string in the specified data leaf are required to be strictly equivalent to the value in the condition in order to be covered by the condition.

Figure 3:
FIG. 3 is a diagram showing a rule coverage process flow including hypothetical data in which a term is generated based on a rule condition and matched with a data point.
Figure 3:

The properties above entail that a rule condition is equivalent to a term in the sense that a condition can be straightforwardly converted into a term maintaining its semantic value. For example, referring to FIG. 3, in an exemplary rule coverage process flow 200 including hypothetical data a first exemplary rule includes a rule condition 202. Informally, the rule condition 202 shall test whether a suspicious test object created a new file named "troj.exe". Knowing how this informally stated condition is encoded in the specific file report log format, a corresponding term 204 is constructed that resembles the condition by pointing to a data leaf "created files[].name" with a value "troj.exe". An example of a data point (e.g., a JSON file) that contains such a term and that satisfies the condition is provided as an exemplary hypothetical covered data point 206. In the context of the evaluator system 70, a rule condition includes a term, and a rule includes one or more terms (i.e., a set of terms)

Referring to Table 1, exemplary first, second, third and fourth rules are provided. The first rule includes one condition. The second, third, and fourth rules each include two conditions. Exemplary data points (in this case, hypothetical JSON files) are listed. Exemplary determinations as to whether or not the exemplary data points would be covered by the respective exemplary first, second, third and fourth rules as applied by the rule coverage estimator 72 are provided. The third rule covers its respective data point because each of the two conditions of the third rule are evaluated independently by the evaluator system 70, and each of the two conditions is satisfied by the respective data point.

TABLE 1

| Rule | | Data Point (JSON file) | Covered? |
|---|---|---|---|
| 1st | created_files[ ].name == "troj.exe" | {<br>  "created_files":[<br>    {"name":"troj.exe"},<br>    {"name":"benign_file.txt"}<br>  ]<br>} | Yes |
| | | {<br>  "created_files":[<br>    {"name":"benign_file.txt"}<br>    {"name":"troj.exe"},<br>  ]<br>} | Yes |
| 2nd | created_files[ ].name == "troj.exe" AND created_files[ ].size == 50000 | {<br>  "created_files":[<br>    {<br>      "name":"benign_file.txt",<br>      "size": 10<br>    },<br>    {<br>      "name":"troj.exe",<br>      "size":50000<br>    }<br>  ]<br>} | Yes |
| 3rd | created_files[ ].name == "troj.exe" AND created_files[ ].size == 10 | | Yes |
| 4th | created_files[ ].name == "troj.exe" AND created_files[ ].name == "win.exe" | {<br>  "created_files":[<br>    {"name":"benign_file.txt"}<br>    {"name":"troj.exe"},<br>  ]<br>} | No |

The evaluator datastore 74 is an inverted index of the population dataset received from the population dataset datastore 80. The evaluator datastore 74 includes a table which has two columns and multiple rows each corresponding to a term observed in the population dataset. As indicated above, each data point (e.g., JSON file) has a unique identifier and is reduced to a set of terms (see e.g., the exemplary reduction process 100). The evaluator datastore 74 is parametrized by a hyper-parameter K which controls the max size of a row. Larger values of K decrease the compression rate while increasing the accuracy of an estimate of distinct values of the evaluator datastore 74.

Each row of the table of the evaluator datastore 74 stores a data point term in the first column used as a look-up key, and a collection of unique identifiers in a second column semantically representing data points which the term occurs in. The collection of unique identifiers is represented by a set unless the term occurs in more than K data points. In that case, the evaluator system 70 transforms the set of unique identifiers into a KMV sketch storing at most K objects. Alternatively, the evaluator system 70 can transform the set of unique identifiers into another sketch type, for example an FM or HLL sketch.

Referring to Table 2 and Table 3, shown are a hypothetical exemplary population dataset of the population dataset datastore 80 and an exemplary evaluator database "DB" of the evaluator datastore 74 populated by the exemplary population dataset "P". The population dataset of Table 2 includes seven (7) data points associated with unique identifiers <UI 1> to <UI 7>. The data points each include one or more terms, <Term A>, <Term B>, <Term C>, or <Term D>. Each data point is converted to a set of one or more terms.

TABLE 2

Exemplary Population Dataset P

| Data Point | UI value | Contents |
|---|---|---|
| <UI 1> | 0.2 | <Term A>, <Term D> |
| <UI 2> | 0.3 | <Term A>, <Term C>, <Term D> |
| <UI 3> | 0.5 | <Term A>, <Term B>, <Term C>, <Term D> |
| <UI 4> | 0.6 | <Term B> |
| <UI 5> | 0.7 | <Term B> |
| <UI 6> | 0.8 | <Term B> |
| <UI 7> | 0.9 | <Term B>, <Term D> |

Table 3 illustrates the populated exemplary evaluator database DB of the evaluator datastore 74 based on the exemplary population dataset P, populated with both sets of unique identifiers and KMVs of unique identifiers used as data representation. The hyper-parameter K is set to four (4). Therefore, the terms B and D which occurred at least in four (4) data points are required to be represented as a collection of unique identifiers of a KMV sketch as opposed to a set. A fundamental property of a KMV sketch is that it stores K items even though the original set that it was constructed from may contain more than K items. For example, term B occurred in a data point <UI 7>, however the corresponding KMV sketch discarded the data point <UI 7> as the KMV sketch already reached its maximum capacity and all contained unique data point identifiers were smaller than the data point <UI 7>.

TABLE 3

Exemplary Evaluator Database DB

| Term (look-up key) | Collection of Unique Identifiers ("UIs") |
|---|---|
| <Term A> | Set A {<UI 1>, <UI 2>, <UI 3>} |
| <Term B> | KMV Sketch B (K = 4) {<UI 3>, <UI 4>, <UI 5>, <UI 6>} |

TABLE 3-continued

Exemplary Evaluator Database DB

| Term (look-up key) | Collection of Unique Identifiers ("UIs") |
|---|---|
| <Term C> | Set C {<UI 2>, <UI 3>} |
| <Term D> | KMV Sketch D (K = 4) {<UI 1>, <UI 2>, <UI 3>, <UI 7>} |

The rule coverage estimator 72 includes a rule coverage algorithm that transforms a rule into a set of condition terms ("conditions"), following the process described above, and utilizes the evaluator datastore 74 to find data points whose term sets contain all condition terms. This is done by intersecting small-sized unique identifiers collections. The intersection cardinality equals to the rule coverage and is the return value of the rule coverage algorithm.

The rule coverage algorithm performed by the rule coverage estimator 72 requires as an input a rule 90, including a set of conditions, combined with AND, and a populated evaluator database of the evaluator datastore 74. The output 92 of the rule coverage estimator 72 includes a number (i.e., cardinality) of the data points (e.g., JSON files) that are covered by all conditions in the input rule 90.

The rule coverage estimator 72 using the coverage algorithm first fetches collections of unique identifiers of data points for each rule condition of the input rule 90 from the populated evaluator database of the evaluator datastore 74. Then the rule coverage estimator 72 computes the intersection cardinality of the fetched collections. The computed intersection cardinality is the rule coverage estimate.

With regards to fetching collections of unique identifiers, the requirements on rule conditions allow for translation into terms which are used as a look-up key in the evaluator database of the evaluator datastore 74. The rule coverage estimator 72 via the rule coverage algorithm translates conditions into terms and fetches corresponding collections of unique identifiers. Each rule condition is associated with either a set of unique identifiers or a KMV sketch, or other sketch type, including unique identifiers.

With regards to cardinality intersection, the rule conditions are sorted into two groups: the rule conditions associated with a set and the rule conditions associated with a KMV sketch. Each group beneficially uses a different intersection algorithm to intersect the collections. The intersection computed from the sets and the intersection computed from the KMV sketches are again intersected, yielding a final intersection whose cardinality is the return value of the rule coverage algorithm of the rule coverage estimator 72. In describing the intersection process, reference is made to the exemplary population dataset P of the population dataset datastore 80 and the exemplary evaluator database DB of the evaluator datastore 74 respectively set forth in Tables 2 and 3.

The sets are intersected by determining identifiers common to all of the sets to which a rule condition is associated to form a set intersection. For example, referring to the exemplary data of Tables 2 and 3, data points covered by a rule including only terms A and C are determined by the intersection of a set A and a set C (A∩C). Set A has the UI values 0.2, 0.3, and 0.5 and the set C had the UI values 0.3 and 0.5. The intersection of set A and set C (A∩C) is 0.3 and 0.5 corresponding to UI 2 and UI 3 respectively. The cardinality of the intersection of set A and set C (A∩C) is 2 (two) (|A∩C|=2), and as such there are 2 (two) data points covered out of a total 7 data points corresponding to a relative rule coverage of |A∩C|/|P|=2/7≅29%.

The KMV sketches are intersected by a KMV intersection method. For example, a KMV sketch includes K number of values and a value theta θ which is equal to the largest value in the KMV sketch by default. To intersect two KMV sketches, for example first and second sketches, a new, third sketch is formed which includes values that are included in both the first and the second sketches. The theta θ of the third sketch is set to the lower value of the input thetas, i.e., the lower of the first sketch theta θ and the second sketch theta θ. The values in the third sketch are an intersection of the values in the first sketch and the values in the second sketch, and therefore, the third sketch may contain fewer than K values. The theta θ of the third sketch is equal to one of the input thetas and therefore may or may not be equal to the largest value in the intersection sketch. In other words, the third sketch (i.e., the intersection) may or may not include its theta θ. A formula for a cardinality estimate of a KMV sketch is K/θ, which formula or other estimating formula can be applied to the third sketch. The described KMV intersection method can be applied to determine the intersection of any number of KMV sketches and corresponding cardinality. KMV sketches are useful to estimate the cardinality of a data stream.

For example, again referring to the data of Tables 2 and 3, data points covered by a rule including only terms B and D are determined by the intersection of a KMV sketch B and a KMV sketch D (B∩D). For each sketch, K=4. KMV sketch B has UI values 0.5, 0.6, 0.7, and 0.8 corresponding to θ =0.8. The estimated cardinality of term B in a hypothetical stream B from which the sketch B was constructed is K/θ=4/0.8=5, which is the same as the actual number of instances of term B in the exemplary population dataset P. KMV sketch D has UI values 0.2, 0.3, 0.5, 0.9 corresponding to θ=0.9. The estimated cardinality of term D in a hypothetical stream D from which the sketch D was constructed is K/θ=4/0.9=4.4. The actual number of instances of term D in the exemplary population dataset P is 4 (four).

The intersection of KMV sketch B and KMV sketch D (B∩D) includes only one (1) UI value (0.5) and corresponds to θ=0.8 (the lowest θ of sketches B and D). The estimated cardinality of an intersection of the hypothetical stream B and the hypothetical stream D based on the intersection of KMV sketch B and KMV sketch D (B∩D) is |B∩D|/θ1/0.8=1.25, which is an estimate of the number data points in the exemplary population dataset covered by the rule, i.e., data points including both term B and term D. This estimated cardinality corresponds to a relative rule coverage of (|B∩D|/θ)/|P|=1.25/7≅=18%. The actual number of datapoints covered by the rule, i.e., data points including both Term B and Term D in the exemplary population dataset is 2 (two).

The set intersection and the KMV intersection are intersected by a KMV intersection method to determine a total intersection including zero or more data points represented by zero or more unique identifiers which represents rule coverage. For example, again referring to the data of Tables 2 and 3 and the above exemplary set and sketch intersections, data points covered by a rule including only terms A, B, C and D are determined by the intersection of: the intersection of set A and set C (A∩C) and the intersection of sketch B and sketch D (B∩D), corresponding to a total intersection ((A∩C)∩(B∩D)). The intersection of set A and set C (A∩C) includes only values 0.3 and 0.5 and corresponds to θ=0.5. The intersection of sketch B and sketch D (B∩D) includes only value 0.5 and corresponds to θ=0.8. The total intersection ((A∩C)∩(B∩D)) includes only one (1) UI value (0.5) and corresponds to θ=0.5, as 0.5 is the lowest theta θ of the intersection of set A and set C (A∩C) and the intersection of sketch B and sketch D (B∩D). The estimated cardinality of the total intersection ((A∩C)∩(B∩D)) is |(A∩C)∩(B∩D)|/θ=1/0.5=2.0, which is an estimate of the number of data points covered by the rule, i.e., data points including Term A, Term B, Term C, and Term D in the exemplary population dataset P. The actual number of datapoints including Term A, Term B, Term C, and Term D in the exemplary population dataset P is 1 (one).

The estimate of the number of data points covered by a rule is divided by the total number of data points in the population dataset to determine an estimated rule coverage ratio. The estimated rule coverage and estimated rule coverage ratio are provided as the output 92. For example, again referring to the data of Tables 2 and 3 and the above exemplary set and sketch intersections for a rule including only terms A, B, C and D, the estimated rule coverage ratio is (|A∩C)∩(B∩D)|/θ)/|P|=2.0/7≅29%.

The value K of a KMV sketch controls the desired data compression rate and the coverage estimation accuracy. Since the two criterions are conflicting, the selection of K will necessarily be a tradeoff between the criterions. Multiple K selection strategies can be used depending on the nature of the target use case. For example, a server running the evaluator system 70 has a fixed amount of free memory available for the evaluator datastore 74. The optimal value K is the highest possible value that allows the evaluator datastore 74 to fit into the server's memory. Such a procedure maximizes the estimation accuracy. Or for example, a target use case determines a good-enough value of the estimation accuracy, then the value K is selected to match the target accuracy while minimizing the amount of memory required to host the evaluator datastore 74. Such a procedure maximizes the data compression rate. For large data point datasets (e.g., one billion report logs) acceptable Ks can range from 10,000 to 500,000, or in some applications even larger.

As described herein, the evaluator system 70 provides a method for solving the rule coverage problem in which population data points are transformed into sets of terms and an inverted index of the population dataset is constructed. Overly frequent terms are represented by a KMV sketch, trading decreased accuracy for increased storage space and computational speed. Alternatively, other parametrizing sketch types may be used to represent terms. A rule to be evaluated is transformed into a set of terms. Coverage of the rule is equated with the number of data point term sets that are a superset of the rule term set.

In an alternative implementation, instead of using unique file identifiers in the evaluator database collections in the evaluator datastore 74, an integral index of the unique file identifiers can be constructed, and the indices can be stored. In this context, all sets involved (including those inside KMV sketches) can be conveniently represented by integer bit sets (e.g., Java Integer BitSets).

As described herein, a term is represented by a data path (i.e., "term path") and a value (i.e., "term value"). Alternatively, to reduce memory footprint, a hash function can be applied, and terms can be replaced with their hashes in an evaluator database of the evaluator datastore 74. By using hashes instead of terms, storage space is saved.

An evaluator database of the evaluator datastore 74 can be updated on-the-fly. For example, the herein described population procedure can be initiated with an already populated evaluator database.

Figure 4:
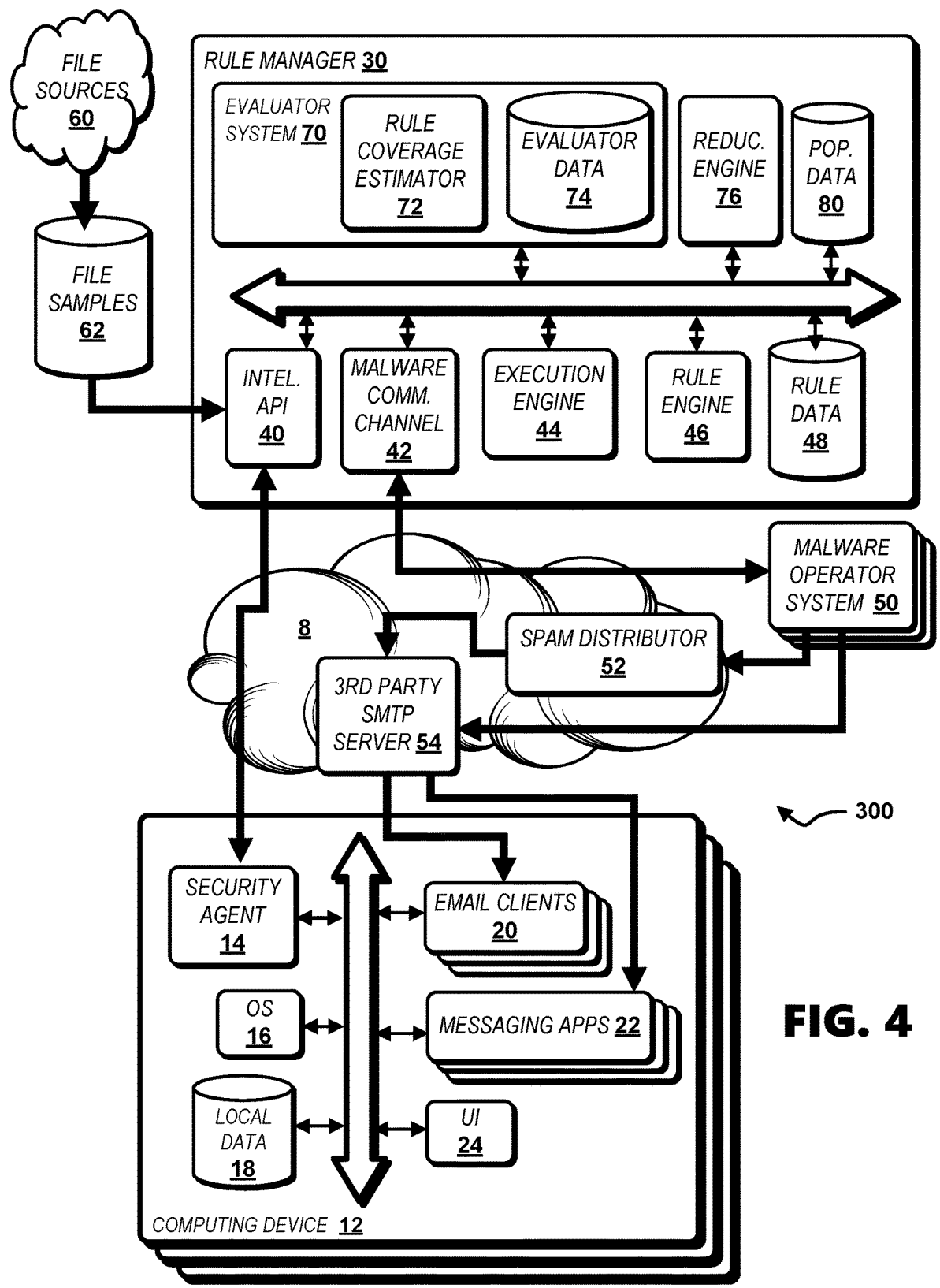
FIG. 4 is a diagram illustrating an environment in which electronic threats are mitigated.

Referring to FIG. 4, an environment 300 is illustrated in which electronic threats facing users of computing devices 12 operating in a computer network 8 are mitigated. The computer network 8 includes one or more wired or wireless networks or a combination thereof, for example including a local area network (LAN), a wide area network (WAN), the internet, mobile telephone networks, and wireless data networks such as Wi-Fi™ and 3G/4G/5G cellular networks. Operating system ("OS") 16 is executed on computing devices 12.

A network-connectable processor-enabled rule manager 30 coupled to a computing device 12 enables threat detection and mitigation to be provided to the computing device 12 via a security agent 14. The security agent 14 is beneficially provided integral with or as an extension to one or more email clients 20 or messaging applications 22 and provides notices to a user via a user interface 24. The rule manager 30 provides threat intelligence including detection rules to the security agent 14, which threat intelligence is stored in the local datastore 18 for enabling the security agent 14 to filter and block email and other message threats received via the email clients 20 and messaging applications 22.

Threat intelligence collected from file sources 60 is supplemented and improved by leveraging the rule manager 30. Sample credentials-stealing malware applications, suspected credentials-stealing malware applications, and links (e.g., including Universal Resource Locators ["URLs"]) to repositories serving known or suspected credentials-stealing malware applications are collected from file sources 60 and stored in a file samples datastore 62. Non-malicious ("clean") files are also stored in the file samples datastore 62. File sources 60 can include external and internal malware sample feeds. File sources 60 can include for instance threat-hunting email honeypots, managed client device security applications (e.g., antivirus applications), malware repository mutual samples exchange systems, threat intelligence feeds, and other threat aggregation platforms (e.g., the VirusTotal™ platform). Applications collected from the file sources 60 may have the capability to find and exfiltrate credentials from a computer on which they are executed ("credentials-stealing malware applications").

Sample malware files and non-malicious files are retrieved by an intelligence application program interface ("API") 40 and used by the rule engine 46 in generating malware detection rules. The rule engine 46 implements artificial intelligence classifiers in generating malware detection rules. Known malware files and known non-malicious files are also used in populating population datasets of the population dataset datastore 80. Malware files can be retrieved by the rule manager 30 from the file samples datastore 62 as complete executable malware applications. Alternatively, URLs or other links can be retrieved by the rule manager 30 from the file samples datastore 62, which URLs or other links can trigger download of malware applications from a malware operator system 50 or other network accessible data repository. Sample malware applications can be run by the execution engine 44. Dynamic analysis of the sample malware applications performed by the execution engine 44 can indicate the threats that the sample malware applications pose. The execution engine 44 executes sample malware applications and gathers corresponding intelligence. Even though the rule manager 30 enables an isolated environment, sample malware applications are enabled to communicate with their respective authors or operators, represented herein as the malware operator systems 50. The malware applications are limited and controlled by the rule manager 30 via the execution engine 44 and the malware communication channel 42.

Extracted cyber threat intelligence by the rule manager 30 is used to enhance cybersecurity measures and protect users against email and other messaging threats. The security agent 14 receives via the intelligence API 40 intelligence updates including rules generated by the rule engine 46. The security agent 14 applies updated filters to one or more email clients 20 or messaging applications 22 based on the intelligence updates. The updated filters enable blocking of malicious electronic communications to the email clients 20 and messaging applications 22. Malicious electronic communications (e.g., emails, electronic text messages) delivered to the email clients 20 or messaging applications 22 can originate for example from a malware operator system or a spam distributor system 52 and be relayed via a third-party SMTP server 54 which may not be enabled for filtering malicious emails.

The security agent 14 transmits intelligence updates to the rule manager 30 via the intelligence API 40 in the form of sample malicious and non-malicious applications, emails, URLs, and links extracted from received emails and messages. Applications can be executed by the execution engine 44 and URLs and links can be followed via the execution engine 44 to trigger downloads of new applications. Malicious and non-malicious applications are used by the rule engine 46 to generate new rules and to populate the population dataset datastore 80.

A reduction engine 76 applies unique identifiers and performs reduction processes, for example the exemplary reduction process 100, on files received from the file samples datastore 62, a security agent 14, or a malware operator system 50 to generate population datasets stored in the population dataset datastore 80. Population datasets are labeled malicious or non-malicious based on labeling of the received files or evaluations performed by the execution engine 44.

The rule engine 46 generates rules 90 which are evaluated by the evaluator system 70 via the rule coverage estimator 72 supported by the evaluator datastore 74 based on the population datasets of the population dataset datastore 80. The population datasets are beneficially known to a high level of confidence (e.g., 99% confidence) to be malicious or non-malicious. Coverages of the rules are determined and provided as outputs 92 of the evaluator system 70. A rule 90 is stored in a rule datastore 48 and transmitted to security agents 14 on computing devices 12 via the intelligence API 40 based on the determined rule coverage. When a rule 90 is tested against a known malicious population dataset, a high true positive rate is desirable. When a rule is tested against a known non-malicious ("benign") dataset, a low false positive rate is desirable. For example, a rule 90 for detecting a malicious file can be transmitted to security agents 14 when the output 92 of the evaluator system 70 indicates a low false positive rate (e.g., 0.1%) and a high true positive rate (e.g., 99.9%) of the rule 90. In such manner, a security agent 14 can use the rule for identifying malicious communications to email clients 20 and messaging applications 22.

Figure 5:
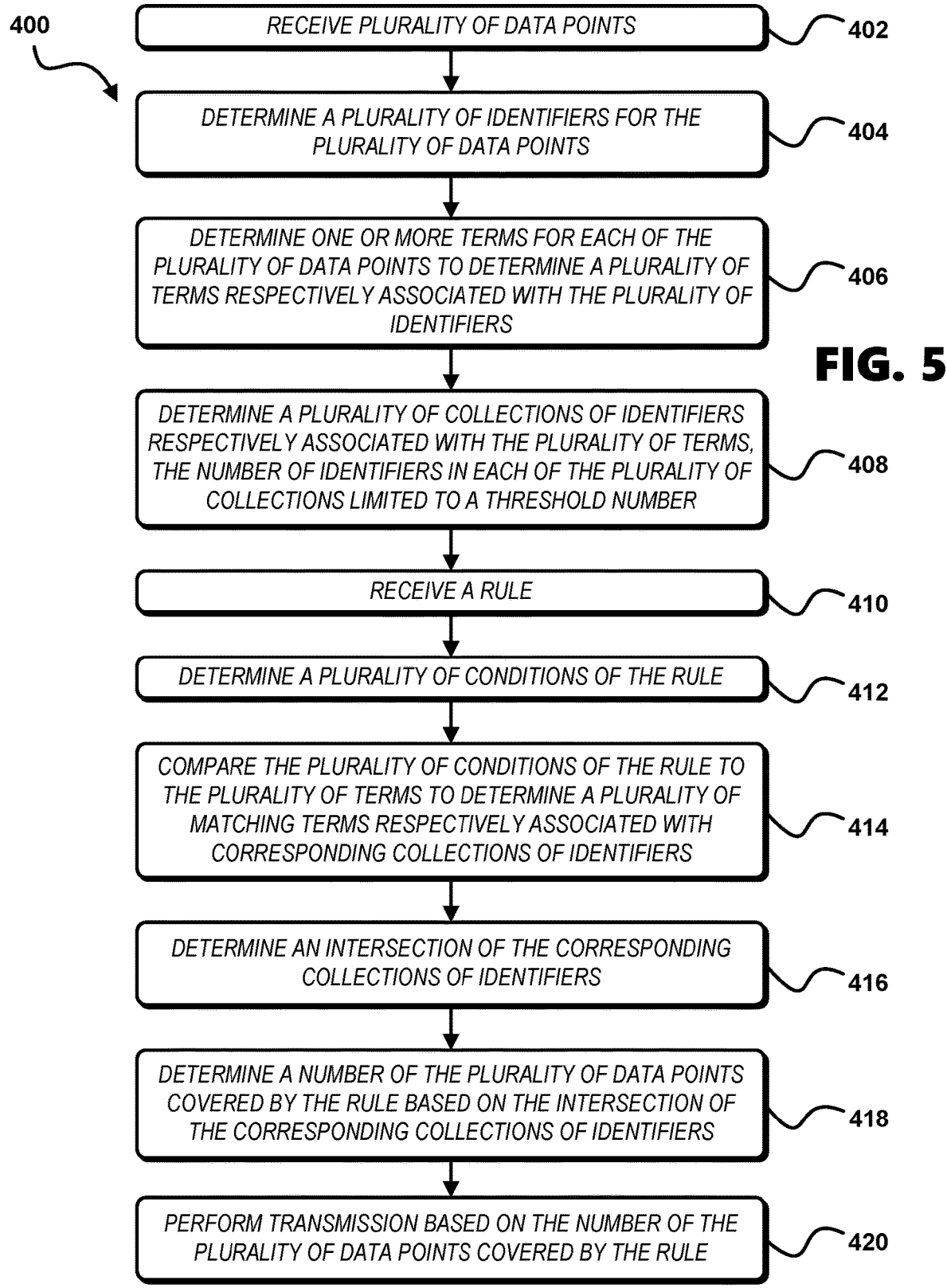
FIG. 5 is a diagram illustrating a method in which rule conditions are compared to terms of data points to determine rule coverage.

Referring to FIG. 5, a method 400 for vetting a security rule is disclosed enabling a transmission (e.g., notification, rule update) based on data points (e.g., applications) covered by the rule. The method 400 is described with reference to the components in the environment 300. Steps of the method 400 can be performed by the rule manager 30 via the evaluator system 70, population dataset datastore 80, and rule datastore 48. Alternatively, the method 400 can be performed via other components in other environments and is not restricted to being implemented by the herein described components.

In a step 402, a plurality of data points are received. For example, a plurality of files can be curated wherein the receiving of the plurality of data points includes receiving the curated plurality of files. The files are beneficially curated as files known to be benign, that is not a threat to computer security ("benign files"). A plurality of identifiers for the plurality of data points are determined (step 404). Determining the plurality of identifiers for the plurality of data points can include applying a hash function to transform the plurality of data points to a plurality of byte sequences. The plurality of identifiers beneficially are unique identifiers of value greater than zero and less than or equal to 1. One or more terms for each of the plurality of data points are determined to determine a plurality of terms respectively associated with the plurality of identifiers (step 406). For example, one term for a data point, two terms for a data point, or three terms for a data point can be determined. Determining the one or more terms for each of the plurality of data points can include for instance determining one or both of a file name or a file size. The plurality of terms can each include a value including a path and a value, the value including one or both of a text string or a number.

Based on the plurality of terms respectively associated with the plurality of identifiers, a plurality of collections of identifiers respectively associated with the plurality of terms are determined, the number of identifiers in each of the plurality of collections of identifiers limited (e.g., truncated) to a threshold number (step 408). Determining the plurality of collections of identifiers can include for example determining a plurality of k minimum value ("KMV") sketches of identifiers. Alternatively other sketch types can be determined.

A rule is received (step 410). The rule can be generated based on a curated set of files of known threat level, wherein the receiving of the rule includes receiving the generated rule. A plurality of conditions for the rule are determined (step 412). The plurality of conditions of the rule are compared to the plurality of terms to determine a plurality of matching terms respectively associated with corresponding collections of identifiers of the plurality of collections of identifiers (step 414). Beneficially each of the plurality of conditions of the rule are matched respectively to ones of the plurality of terms. An intersection of the corresponding collections of identifiers are determined (step 416). A number of the plurality of data points covered by the rule is determined based on the intersection of the corresponding collections of identifiers (step 418).

A transmission is performed based on the number of the plurality of data points covered by the rule (step 420). Performing the transmission can include transmitting the rule to a computing device based on the number of the plurality of data points covered by the rule. Performing the transmission can further include transmitting the rule to a computing device based on the number of the plurality of data points covered by the rule and the total number of the plurality of data points. Alternatively, performing the transmission can include transmitting an indication of the number of the plurality of data points covered by the rule. The method can further include determining the number of the plurality of data points covered by the rule divided by the number of the plurality of data points, wherein the transmission is performed based on a number of the plurality of data points covered by the rule divided by a total number of the plurality of data points. Performing the transmission can further include transmitting an indication of the number of the plurality of data points covered by the rule divided by the total number of the plurality of data points.

Beneficially, receiving the plurality of data points includes receiving a first plurality of labeled file samples. Further, a second plurality of labeled file samples are received, and the rule is generated based on the second plurality of labeled file samples.

In a particular implementation of the method 400, the largest identifier of each of the corresponding collections of identifiers is determined, and the smallest identifier of the largest identifiers of the corresponding collections of identifiers is determined. The number of identifiers of the intersection of the corresponding collections of identifiers is determined, and the number of the plurality of data points covered by the rule is determined based on the number of identifiers of the intersection and the smallest identifier of the largest identifiers of the corresponding collections of identifiers. For example, the number of identifiers of the intersection can be divided by the smallest identifier of the largest identifiers of the corresponding collections of identifiers, and the number of the plurality of data points covered by the rule can be determined based on the number of identifiers of the intersection divided by the smallest identifier of the largest identifiers of the corresponding collections of identifiers. The corresponding collections of identifiers can include a group of collections in which the number of identifiers is equal to the threshold number in each collection of the group of collections.

With reference to step 416, the corresponding collections of identifiers can include for example a first collection or multiple collections in which the number of identifiers is less than the threshold number and a second collection or multiple collections in which the number of identifiers is equal to the threshold number. With reference to step 408, the number of identifiers in the second collection are for example truncated to the threshold number or by chance determined to be exactly the threshold number based on the plurality of terms respectively associated with the plurality of identifiers.

With further reference to step 416, in a particular implementation the corresponding collections of identifiers include a first group of collections in which the number of identifiers is less than the threshold number in each collection of the first group of collections and a second group of collections in which the number of identifiers is equal to the threshold number in each collection of the second group of collections. With reference to steps 418 and 420, in a particular implementation an intersection of the first group of collections is determined, an intersection of the second group of collections is determined, and an intersection of the intersection of the first group of collections and the intersection of the second group of collections is determined to determine the intersection of the corresponding collections of identifiers. Determining the intersection of the first group of collections includes determining identifiers common to the collections of the first group of collections. Determining the intersection of the second group of collections includes determining identifiers common to the collections of the second group of collections. Determining the intersection of the intersection of the first group of collections and the intersection of the second group of collections includes determining identifiers common to the intersection of the first group of collections and the intersection of the second group of collections. Further, the largest identifier of the intersection of the first group of collections is determined. The largest identifier of each of the collections of the second group of collections is determined. The smallest identifier of the largest identifiers of the collections of the second group of collections is determined. The smaller of a) the smallest identifier of the largest identifiers of the collections of the second group of collections and b) the largest identifier of the intersection of the first group of collections is determined. The number of identifiers of the intersection of the corresponding collections of identifiers is determined. The number of the plurality of data points covered by the rule is determined based on the number of identifiers of the intersection of the corresponding collections of identifiers and the smaller of a) the smallest identifier of the largest identifiers of the collections of the second group of collections and b) the largest identifier of the intersection of the first group of collections. The number of the plurality of data points covered by the rule is beneficially determined as the number of identifiers of the intersection of the corresponding collections of identifiers divided by the smaller of a) the smallest identifier of the largest identifiers of the collections of the second group of collections and b) the largest identifier of the intersection of the first group of collections.

Figure 6:
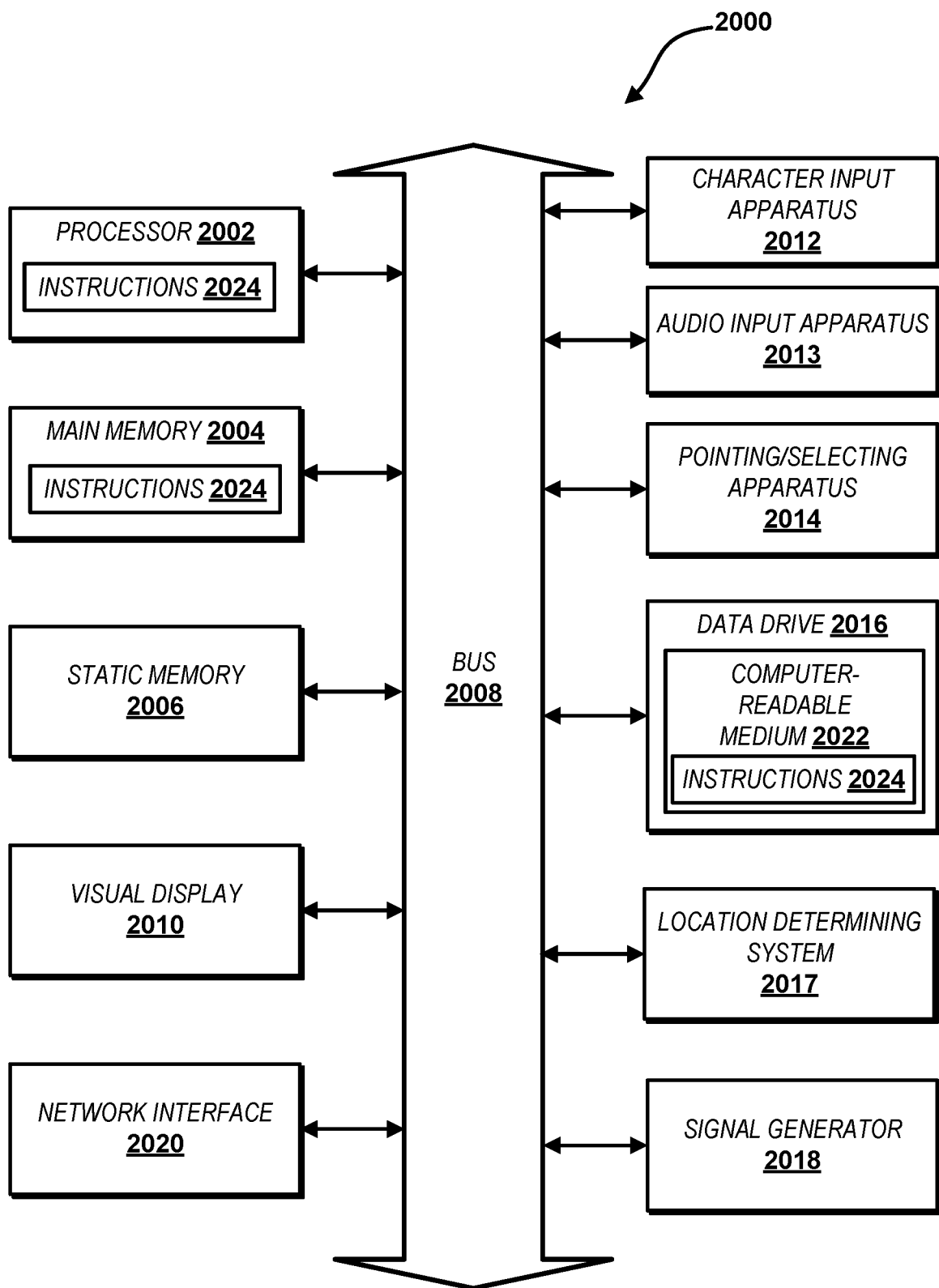
FIG. 6 is a diagram showing a computer system for performing described methods according to illustrative embodiments.

FIG. 6 illustrates in abstract the function of an exemplary computer system 2000 on which the systems, methods and processes described herein can execute. For example, the rule manager 30, computing device 12, or components thereof can each be embodied by a particular computer system 2000. The computer system 2000 may be provided in the form of a personal computer, laptop, handheld mobile communication device, mainframe, distributed computing system, or other suitable computer configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for performing a malware threat intelligence update, the method comprising:
   receiving a plurality of data points comprising a plurality of files;
   determining a plurality of identifiers for the plurality of data points, the determining the plurality of identifiers for the plurality of data points comprising applying a hash function to transform the plurality of data points to a plurality of byte sequences;
   determining at least one term for each of the plurality of data points to determine a plurality of terms respectively associated with the plurality of identifiers;
   compressing the plurality of data points, the compressing comprising determining, based on the plurality of terms respectively associated with the plurality of identifiers, a plurality of collections of identifiers respectively associated with the plurality of terms, and limiting the number of identifiers in each of the plurality of collections to a threshold number;
   receiving a rule;
   determining a plurality of conditions of the rule;
   comparing the plurality of conditions of the rule to the plurality of terms to determine a plurality of matching terms respectively associated with corresponding collections of identifiers of the plurality of collections of identifiers;
   determining an intersection of the corresponding collections of identifiers;
   determining a number of the plurality of data points covered by the rule based on the intersection of the corresponding collections of identifiers; and
   updating malware threat intelligence of a computing device based on the number of the plurality of data points covered by the rule, the updating comprising performing a transmission of the rule to the computing device based on the number of the plurality of data points covered by the rule;
   detecting an electronic message received by the computing device;
   comparing the plurality of conditions of the rule to the electronic message received by the computing device; and
   blocking the electronic message based on the comparing of the plurality of conditions of the rule to the electronic message.

2. The method of claim 1, wherein the determining the plurality of collections of identifiers comprises determining a plurality of k minimum value ("KMV") sketches of identifiers.

3. The method of claim 1, further comprising determining the number of the plurality of data points covered by the rule divided by the number of the plurality of data points, wherein the transmission is further performed based on a number of the plurality of data points covered by the rule divided by a total number of the plurality of data points.

4. The method of claim 1, wherein performing the transmission comprises transmitting the rule to the computing device based on the number of the plurality of data points covered by the rule.

5. The method of claim 1, wherein performing the transmission comprises transmitting the rule to the computing device based on the number of the plurality of data points covered by the rule and the total number of the plurality of data points.

6. The method of claim 1, wherein performing the transmission comprises transmitting an indication of the number of the plurality of data points covered by the rule.

7. The method of claim 1, wherein performing the transmission comprises transmitting an indication of the number of the plurality of data points covered by the rule divided by the total number of the plurality of data points.

8. The method of claim 1, further comprising:
determining the largest identifier of each of the corresponding collections of identifiers;
determining the smallest identifier of the largest identifiers of the corresponding collections of identifiers;
determining the number of identifiers of the intersection of the corresponding collections of identifiers; and
determining the number of the plurality of data points covered by the rule based on the number of identifiers of the intersection and the smallest identifier of the largest identifiers of the corresponding collections of identifiers.

9. The method of claim 8, further comprising determining the number of the plurality of data points covered by the rule based on the number of identifiers of the intersection divided by the smallest identifier of the largest identifiers of the corresponding collections of identifiers.

10. The method of claim 8, wherein the corresponding collections of identifiers comprise a group of collections in which the number of identifiers is equal to the threshold number in each collection of the group of collections.

11. The method of claim 1, wherein the corresponding collections of identifiers comprise:
at least a first collection in which the number of identifiers is less than the threshold number; and
at least a second collection in which the number of identifiers is equal to the threshold number.

12. The method of claim 1, wherein the corresponding collections of identifiers comprise:
a first group of collections in which the number of identifiers is less than the threshold number in each collection of the first group of collections; and
a second group of collections in which the number of identifiers is equal to the threshold number in each collection of the second group of collections.

13. The method of claim 12, further comprising:
determining an intersection of the first group of collections;
determining an intersection of the second group of collections; and
determining an intersection of the intersection of the first group of collections and the intersection of the second group of collections to determine the intersection of the corresponding collections of identifiers.

14. The method of claim 13, wherein:
determining the intersection of the first group of collections comprises determining identifiers common to the collections of the first group of collections;
determining the intersection of the second group of collections comprises determining identifiers common to the collections of the second group of collections; and
determining the intersection of the intersection of the first group of collections and the intersection of the second group of collections comprises determining identifiers common to the intersection of the first group of collections and the intersection of the second group of collections, the method further comprising:
determining the largest identifier of the intersection of the first group of collections;
determining the largest identifier of each of the collections of the second group of collections;
determining the smallest identifier of the largest identifiers of the collections of the second group of collections;
determining the smaller of the smallest identifier of the largest identifiers of the collections of the second group of collections and the largest identifier of the intersection of the first group of collections;
determining the number of identifiers of the intersection of the corresponding collections of identifiers; and
determining the number of the plurality of data points covered by the rule based on the number of identifiers of the intersection of the corresponding collections of identifiers and the smaller of the smallest identifier of the largest identifiers of the collections of the second group of collections and the largest identifier of the intersection of the first group of collections.

15. The method of claim 14, further comprising determining the number of the plurality of data points covered by the rule as the number of identifiers of the intersection of the corresponding collections of identifiers divided by the smaller of the smallest identifier of the largest identifiers of the collections of the second group of collections and the largest identifier of the intersection of the first group of collections.

16. The method of claim 1, wherein receiving the plurality of data points comprising the plurality of files comprises receiving a first plurality of labeled file samples.

17. The method of claim 16, further comprising:
receiving a second plurality of labeled file samples; and
generating the rule based on the second plurality of labeled file samples.

18. The method of claim 1, wherein the plurality of identifiers comprise unique identifiers.

19. The method of claim 1, wherein the plurality of identifiers are unique identifiers greater than zero and less than or equal to 1.

20. The method of claim 1, further comprising curating a plurality of benign files, wherein the receiving of the plurality of data points comprising the plurality of files comprises receiving the curated plurality of benign files.

21. The method of claim 1, wherein each of the plurality of conditions of the rule are matched respectively to ones of the plurality of terms.

22. The method of claim 1, wherein determining the at least one term for each of the plurality of data points comprises determining at least one of a file name or a file size.

23. The method of claim 1, wherein determining the at least one term for each of the plurality of data points comprises determining at least two terms for each of the plurality of data points.

24. The method of claim 1, further comprising generating the rule based on a curated set of files of known threat level, wherein the receiving of the rule comprises receiving the generated rule.

25. The method of claim 1, wherein the plurality of terms each comprise a value comprising at least one of a text string or a number.

26. The method of claim 1, wherein the plurality of terms each comprise a path and a value, the value comprising at least one of a text string or a number.

27. A system for performing a malware threat intelligence update, the system comprising:
one or more processors; and
memory storing executable instructions that, as a result of being executed, cause the system to perform operations comprising:
receiving a plurality of data points comprising a plurality of files;
determining a plurality of identifiers for the plurality of data points, the determining the plurality of identifiers for the plurality of data points comprising applying a hash function to transform the plurality of data points to a plurality of byte sequences;
determining at least one term for each of the plurality of data points to determine a plurality of terms respectively associated with the plurality of identifiers;
compressing the plurality of data points, the compressing comprising determining, based on the plurality of terms respectively associated with the plurality of identifiers, a plurality of collections of identifiers respectively associated with the plurality of terms, and limiting the number of identifiers in each of the plurality of collections of identifiers to a threshold number;
receiving a rule;
determining a plurality of conditions of the rule;
comparing the plurality of conditions of the rule to the plurality of terms to determine a plurality of matching terms respectively associated with corresponding collections of identifiers of the plurality of collections of identifiers;
determining an intersection of the corresponding collections of identifiers;
determining a number of the plurality of data points covered by the rule based on the intersection of the corresponding collections of identifiers; and
updating malware threat intelligence of a computing device based on the number of the plurality of data points covered by the rule, the updating comprising performing a transmission of the rule to the computing device based on the number of the plurality of data points covered by the rule, wherein the malware threat intelligence is configured to detect an electronic message received by the computing device, compare the plurality of conditions of the rule to the electronic message received by the computing device, and block the electronic message based on the comparing of the plurality of conditions of the rule to the electronic message.

28. A non-transitory computer-readable storage medium storing executable instructions that, as a result of execution by one or more processors of a computer system, cause the computer system to perform operations comprising:
receiving a plurality of data points comprising a plurality of files;
determining a plurality of identifiers for the plurality of data points, the determining the plurality of identifiers for the plurality of data points comprising applying a hash function to transform the plurality of data points to a plurality of byte sequences;
determining at least one term for each of the plurality of data points to determine a plurality of terms respectively associated with the plurality of identifiers;
compressing the plurality of data points, the compressing comprising determining, based on the plurality of terms respectively associated with the plurality of identifiers, a plurality of collections of identifiers respectively associated with the plurality of terms, and limiting the number of identifiers in each of the plurality of collections of identifiers to a threshold number;
receiving a rule;
determining a plurality of conditions of the rule;
comparing the plurality of conditions of the rule to the plurality of terms to determine a plurality of matching terms respectively associated with corresponding collections of identifiers of the plurality of collections of identifiers;
determining an intersection of the corresponding collections of identifiers;
determining a number of the plurality of data points covered by the rule based on the intersection of the corresponding collections of identifiers; and
updating malware threat intelligence of a computing device based on the number of the plurality of data points covered by the rule, the updating comprising performing a transmission of the rule to the computing device based on the number of the plurality of data points covered by the rule, wherein the malware threat intelligence is configured to detect an electronic message received by the computing device, compare the plurality of conditions of the rule to the electronic message received by the computing device, and block the electronic message based on the comparing of the plurality of conditions of the rule to the electronic message.

29. The method of claim 1, further comprising:
receiving by a computing system the plurality of data points;
determining a free memory of the computing system;
determining the threshold number based on the free memory of the computing system;
hosting the compressed plurality of data points in the free memory; and
determining the intersection of the corresponding collections of identifiers based on the compressed plurality of data points in the free memory.

30. The method of claim 29, wherein:
the determining the plurality of collections of identifiers comprises determining a plurality of k minimum value ("KMV") sketches of identifiers;
the threshold number comprises a k minimum value of the plurality of KMV sketches; and
the determining the threshold number comprises determining the k minimum value based on the free memory wherein the compressed plurality of data points are configured to fit in the free memory.

31. The method of claim 1, further comprising:
providing a plurality of computing devices comprising an agent executed on the plurality of computing devices;
receiving from the plurality of computing devices via a network via the agent the plurality of files from the plurality of computing devices, the plurality of files comprising at least one of a plurality of applications, a plurality of emails, a plurality of URLs, or a plurality of links, wherein the data points comprise the plurality of files; and performing the transmission of the rule via the network to the computing device.

32. The method of claim 31, further comprising generating the rule based on the at least one of the plurality of applications, the plurality of emails, the plurality of URLs, or the plurality of links.

\* \* \* \* \*